United States Patent
Myojo

(10) Patent No.: US 7,071,975 B2
(45) Date of Patent: Jul. 4, 2006

(54) IMAGE PICKUP APPARATUS

(75) Inventor: Toshihiko Myojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 09/947,357

(22) Filed: Sep. 7, 2001

(65) Prior Publication Data

US 2002/0030752 A1    Mar. 14, 2002

(30) Foreign Application Priority Data

Sep. 12, 2000    (JP)    .............................. 2000-276728

(51) Int. Cl.
    *H04N 5/76*    (2006.01)
    *H04N 5/232*    (2006.01)
(52) U.S. Cl. ................. 348/231.9; 348/211.1
(58) Field of Classification Search ........... 348/231.99, 348/231.1, 231.2, 231.6, 231.7, 231.9, 207.1, 348/552, 211.2, 211.1; 711/115; 713/300; 455/557, 412.1
    See application file for complete search history.

(56) References Cited

U.S. PATENT DOCUMENTS

| | | | | |
|---|---|---|---|---|
| 5,561,458 A | * | 10/1996 | Cronin et al. ............. | 348/231.7 |
| 5,640,202 A | * | 6/1997 | Kondo et al. ............. | 348/222.1 |
| 5,754,227 A | | 5/1998 | Fukuoka | |
| 5,778,195 A | | 7/1998 | Gochi | |
| 5,790,193 A | * | 8/1998 | Ohmori .................... | 348/231.9 |
| 5,815,205 A | * | 9/1998 | Hashimoto et al. .......... | 348/552 |
| 5,917,542 A | * | 6/1999 | Moghadam et al. .... | 348/231.99 |
| 6,005,613 A | * | 12/1999 | Endsley et al. .......... | 348/231.6 |
| 6,104,430 A | * | 8/2000 | Fukuoka .................. | 348/231.6 |
| 6,151,652 A | * | 11/2000 | Kondo et al. ............... | 713/300 |
| 6,229,954 B1 | * | 5/2001 | Yamagami et al. ......... | 386/117 |

(Continued)

FOREIGN PATENT DOCUMENTS

| | | | |
|---|---|---|---|
| EP | 1001348 A2 | * | 5/2000 |
| JP | 04170881 A | * | 6/1992 |
| JP | 9-16735 | | 1/1997 |
| JP | 09-083930 | | 3/1997 |
| JP | 9-83930 | | 3/1997 |
| JP | 10276390 A | * | 10/1998 |
| JP | 10308981 A | * | 11/1998 |
| JP | 2000-341616 | | 12/2000 |

OTHER PUBLICATIONS

European Search Report dated Jul. 29, 2004 (Ref. No. 2784430).

(Continued)

*Primary Examiner*—Aung Moe
(74) *Attorney, Agent, or Firm*—Fitzpatrick, Cella, Harper & Scinto

(57) ABSTRACT

In an image pickup apparatus capable of mounting a media card 101 having a nonvolatile memory and a communication circuit, when image data of a captured image is transmitted to an external, the image data corresponding to a data length of a packet is stored in the nonvolatile memory of the media card, and the image data is sent to the communication circuit 103 of the media card and divided into a plurality of packets to be transmitted to the external. When transmission of the image data is aborted, the image data still not stored in the nonvolatile memory is stored in the nonvolatile memory.

24 Claims, 12 Drawing Sheets

U.S. PATENT DOCUMENTS

| | | | |
|---|---|---|---|
| 6,429,896 B1* | 8/2002 | Aruga et al. | 348/552 |
| 6,891,567 B1* | 5/2005 | Steinberg | 348/552 |
| 2002/0030750 A1* | 3/2002 | Mizutani | 348/552 |
| 2002/0030752 A1* | 3/2002 | Myojo | 348/552 |
| 2005/0085263 A1* | 4/2005 | Kim et al. | 455/556.1 |

OTHER PUBLICATIONS

Official Action from Japanese Patent Office, dated Feb. 27, 2004, in corresponding JP 2000-276728 (with English translation).

* cited by examiner

IMAGE PICKUP APPARATUS

BACKGROUND OF THE INVENTION

1. Field of the Invention

The present invention relates to an image pickup apparatus connectable to a card.

2. Related Background Art

Japanese Patent Application Laid Open No. 9-83930 proposes an electronic camera capable of transmitting image data to the external by using a built-in communication control circuit or a communication card connected to a card connector.

When an IC memory card is mounted on the card connector of the electronic camera, image data is recorded in the IC memory card and transmitted to the external by using the built-in communication control circuit. If a communication card is mounted on the card connector, image data is once recorded in an internal buffer memory and transmitted to the external by using the communication card.

A conventional electronic camera is, however, associated with some danger that image data to be transmitted to the external by using the communication card may be lost by user's erroneous operations.

SUMMARY OF THE INVENTION

The present invention has been made to solve such a problem. It is an object of the invention to provide an image pickup apparatus capable of storing image data reliably in the apparatus when image data is transmitted to the external by using a communication card.

It is another object of the present invention to provide an image pickup apparatus in which image data is stored in a memory of a card and supplied to a communication means of the card to thereafter transmit the image data to the external.

It is another object of the present invention to provide an image pickup apparatus in which image data is stored in a memory of a card and transmitted to the external by using a communication means.

Other objects and features of the present invention will become apparent from the following detailed description of embodiments when read in conjunction with the accompanying drawings.

DETAILED DESCRIPTION OF THE PREFERRED EMBODIMENTS

Embodiments of the invention will be described with reference to the accompanying drawings.

(First Embodiment)

Figure 1:
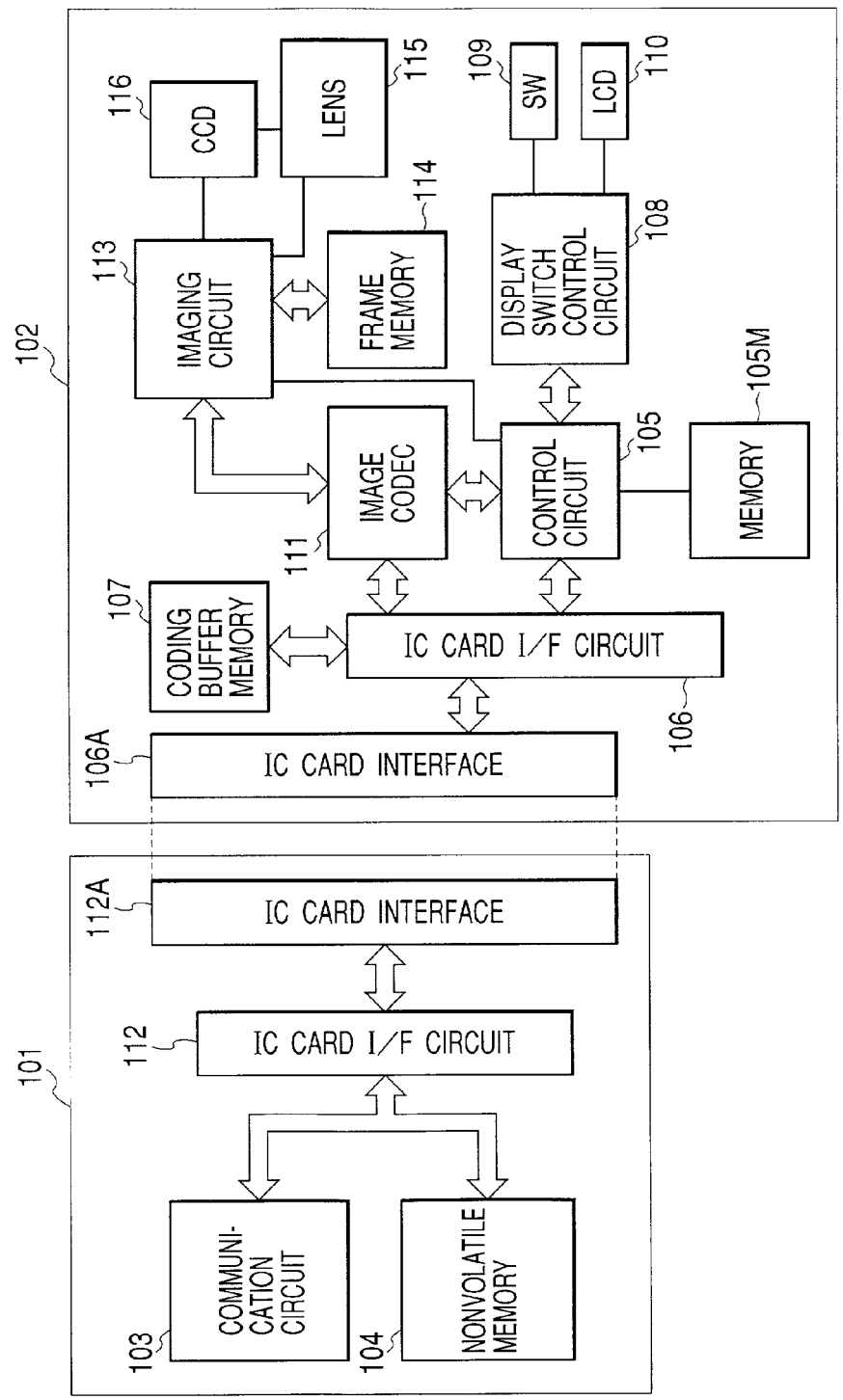
FIG. 1 is a block diagram showing the structure of an electronic image pickup apparatus according to a first embodiment of the invention.

FIG. 1 is a block diagram showing the structure of an electronic image pickup apparatus according to the first embodiment of the invention.

FIG. 1 shows the structures of a camera main body 102 and a media card 101 mounted on the camera main body 102. The media card 102 has the size and shape similar to a memory card, and mounted on the camera main body 102 in place of a memory card.

In FIG. 1, reference numeral 101 represents the media card, and reference numeral 102 represents the camera main body 102.

In the media card 101, a communication circuit 103 executes a control program for wireless communications, for example. A nonvolatile memory 104 is made of, for example, a flash memory and stores captured image data. An IC card interface circuit 112 is used for data transfer to and from the camera main body 102.

In the camera main body 102, a control circuit 105 controls various operations, the control contents being described later with reference to FIGS. 2 to 11. Reference symbol 105M represents a memory.

An IC card interface 106 is used for data transfer to and from the media card 101. A buffer memory 107 temporarily stores image data after the coding process by a CODEC 111.

A display/switch control circuit 108 controls various switches 109 of the camera main body 102 and a liquid crystal display device (hereinafter called an "LCD") 110. The switches 109 includes a capture switch for instructing to capture an image, a menu switch for instructing to display a menu, and other switches. The liquid crystal display device (LCD) 110 is used for determining an image to be captured by a user or checking an already captured image.

The image CODEC 111 processes image data, such as a compression and coding process and an encoding process, e.g., JPEG or the like. An imaging circuit 113 controls an optical system such as a zoom lens 115 and converts an image signal supplied from a photoelectric conversion device CCD 116 into image data, upon reception of an instruction from the control circuit 105. A frame memory 114 stores non-compressed image data generated by the imaging circuit 113.

An IC card interface 106A is connected to the media card 101 which can be removably mounted on the camera main body. An IC card interface 112A has the function similar to the IC card interface 106A.

Figure 2:
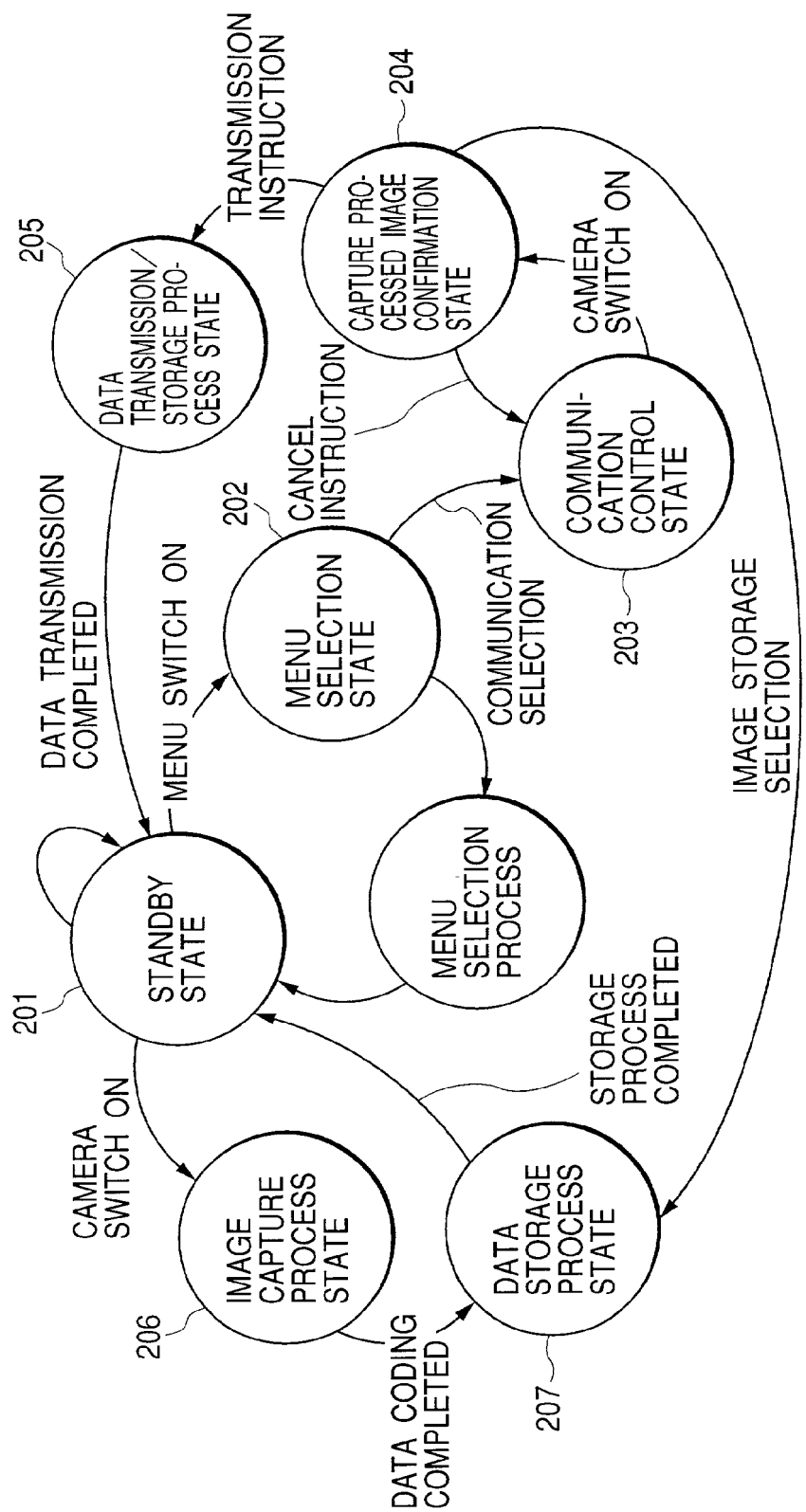
FIG. 2 is a state transition diagram showing the transition of various process states of a control circuit of a camera main body shown in FIG. 1.

FIG. 2 is a state transition diagram showing the transition between various process states of the control circuit 105 of the camera main body 102 shown in FIG. 1.

A standby state 201 is a state in which the control circuit 105 stands by until a user enters an operation instruction after the power is turned on and the initialization process is completed. A menu selection state 202 is a state in which the control circuit 105 stands by until one of menu items is selected which items are representative of various functions of the camera main body 102 and are displayed when a user turns on the menu switch among the various switches 109 of the camera main body 102.

A communication control state 203 is a state which is transited when "communication" is selected from the displayed menu. A capture processed image confirmation state 204 is a state which is transited when the capture switch among various switches 109 is turned on after the "communication" is selected. Image data captured in this state 204 is encoded and temporarily stored in the buffer memory 107, and at the same time a captured image is displayed for confirmation.

A data transmission/storage process state 205 is a state in which the image data temporarily stored in the buffer memory 107 is transmitted to the media card 101, transmitted to the external via the communication circuit 103 and stored in the nonvolatile memory 104, after "transmission instruction" is issued.

In each state described above, a transmission process for captured images is executed. Various process states of the control circuit 105 also include an image capture process state 206, a data storage process state 207 and the like during the normal capture process while the transmission process is not executed.

Figure 3:
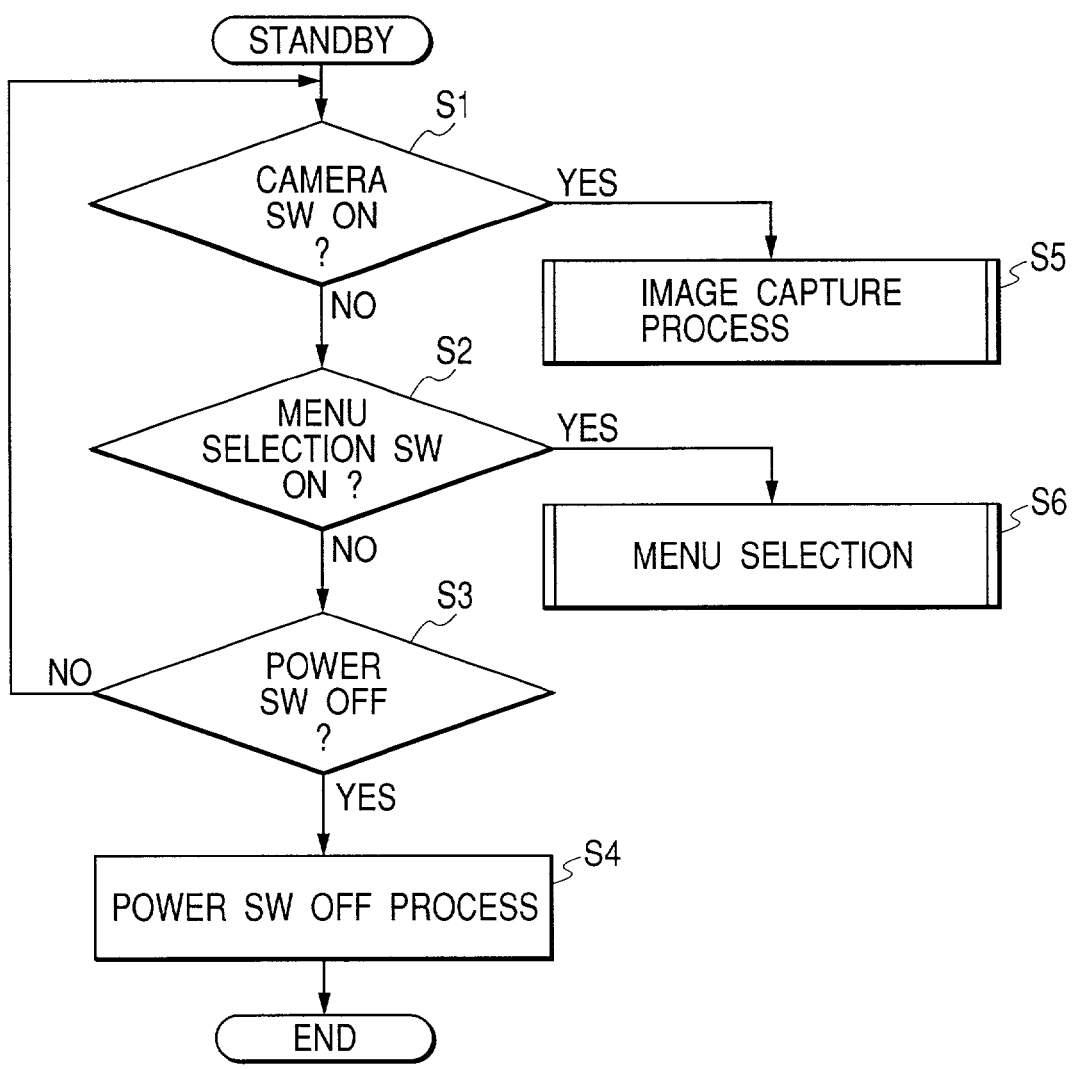
FIG. 3 is a flow chart illustrating the process to be executed by the control circuit in a standby state.
Figure 4:
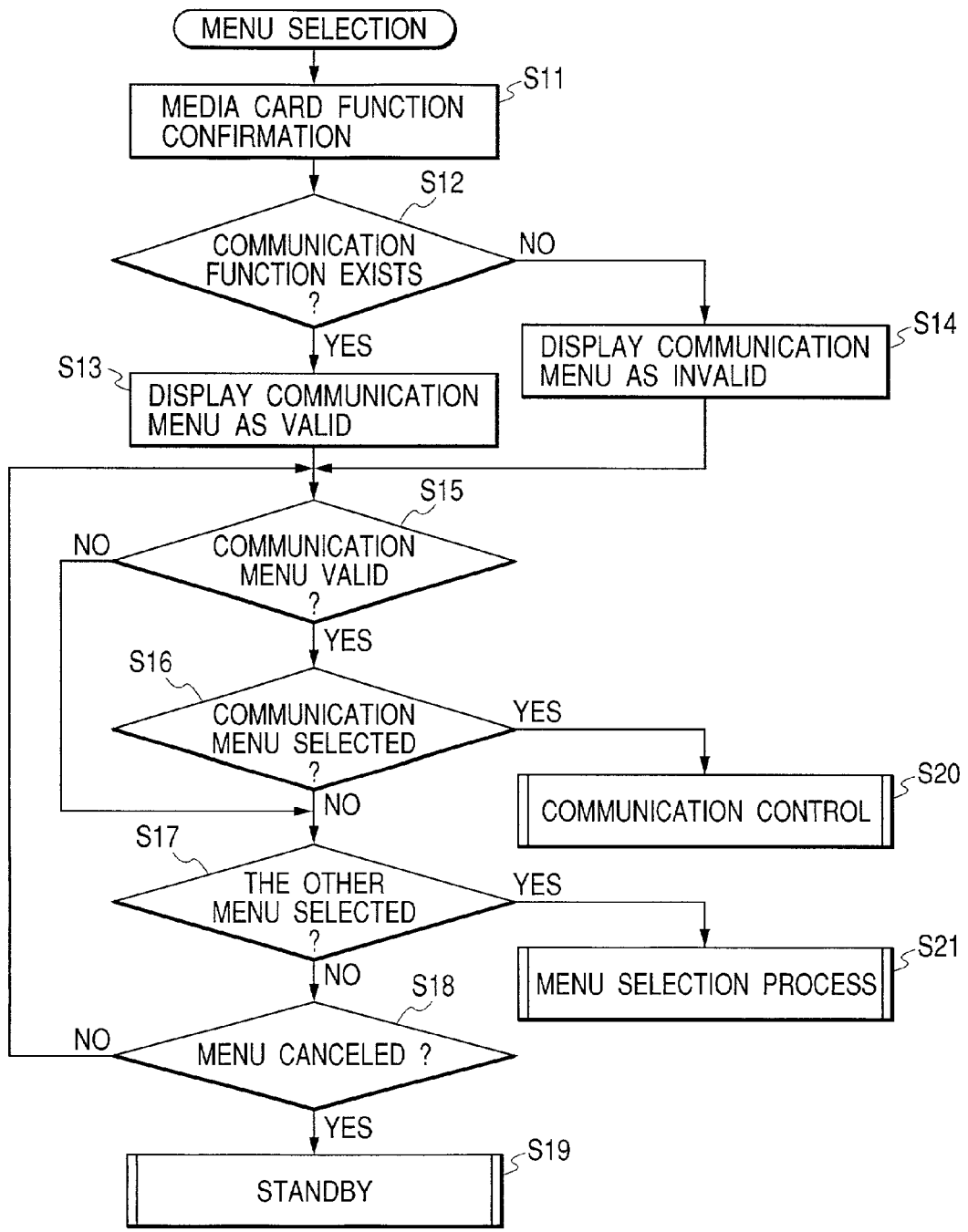
FIG. 4 is a flow chart illustrating the process to be executed by the control circuit in a menu selection state.
Figure 5:
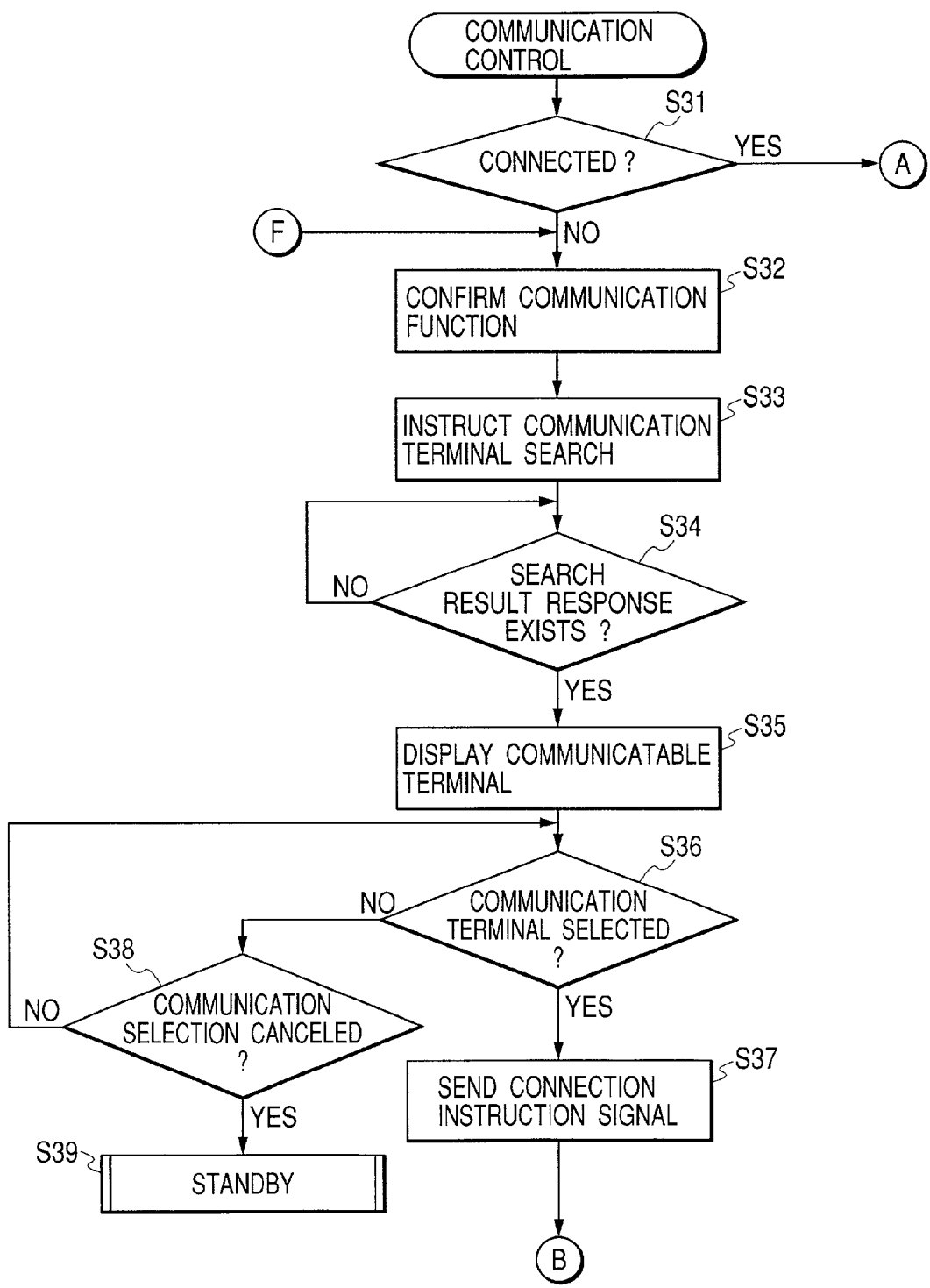
FIGS. 5 and 6 are flow charts illustrating the process to be executed by the control circuit in a communication control circuit.
Figure 6:
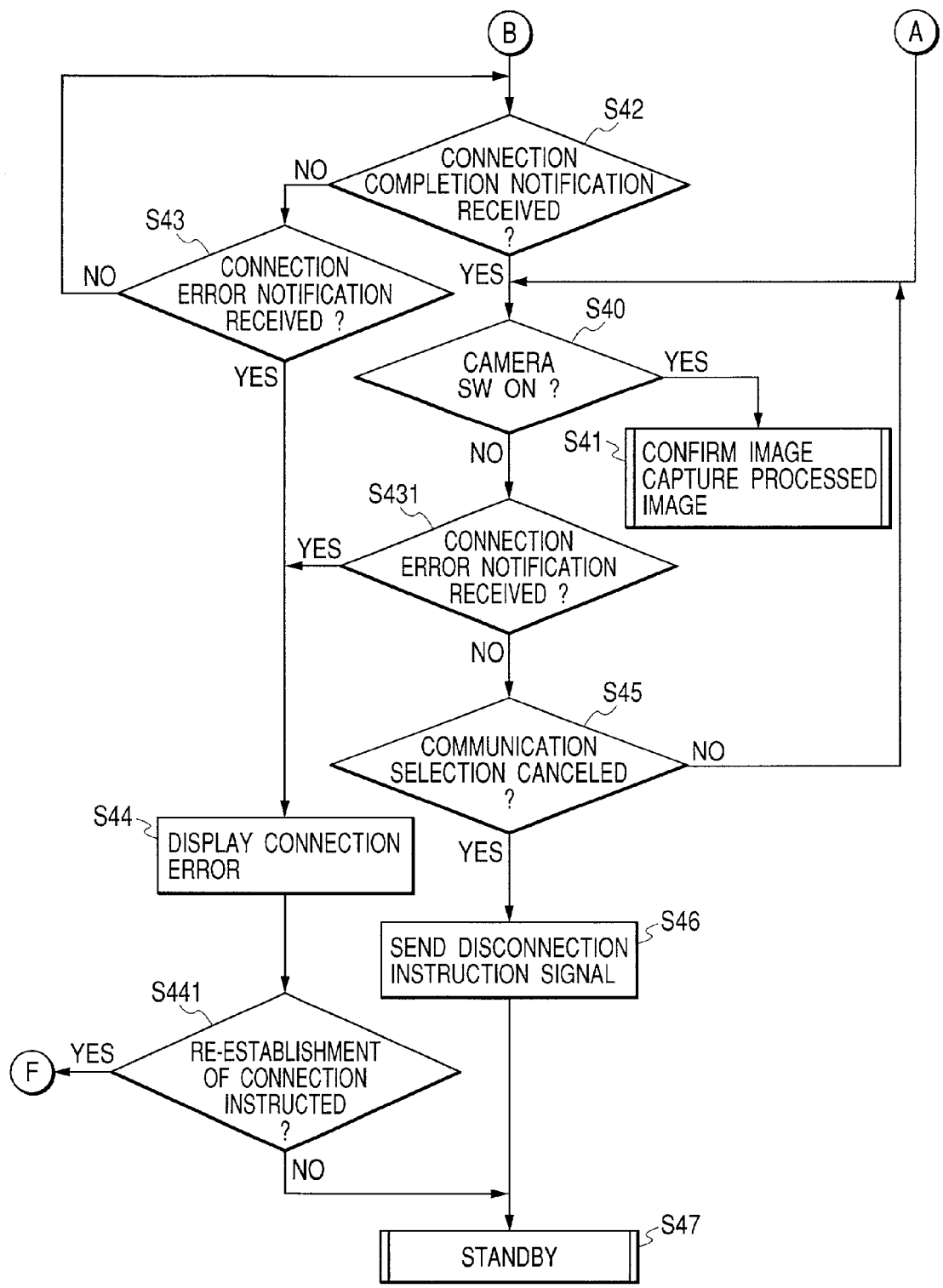
Figure 7:
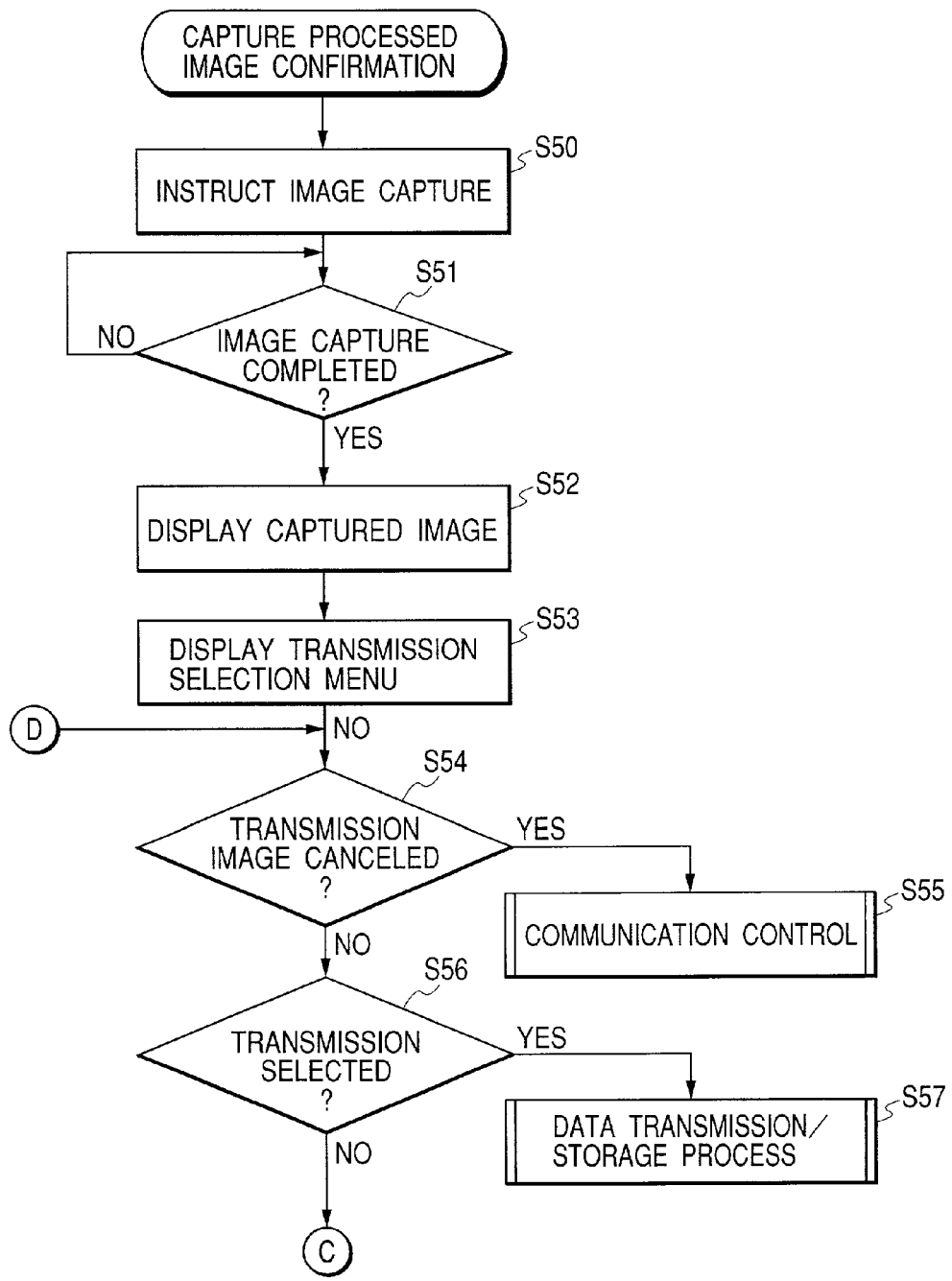
FIGS. 7 and 8 are flow charts illustrating the process to be executed by the control circuit in a capture processed image confirmation state.
Figure 8:
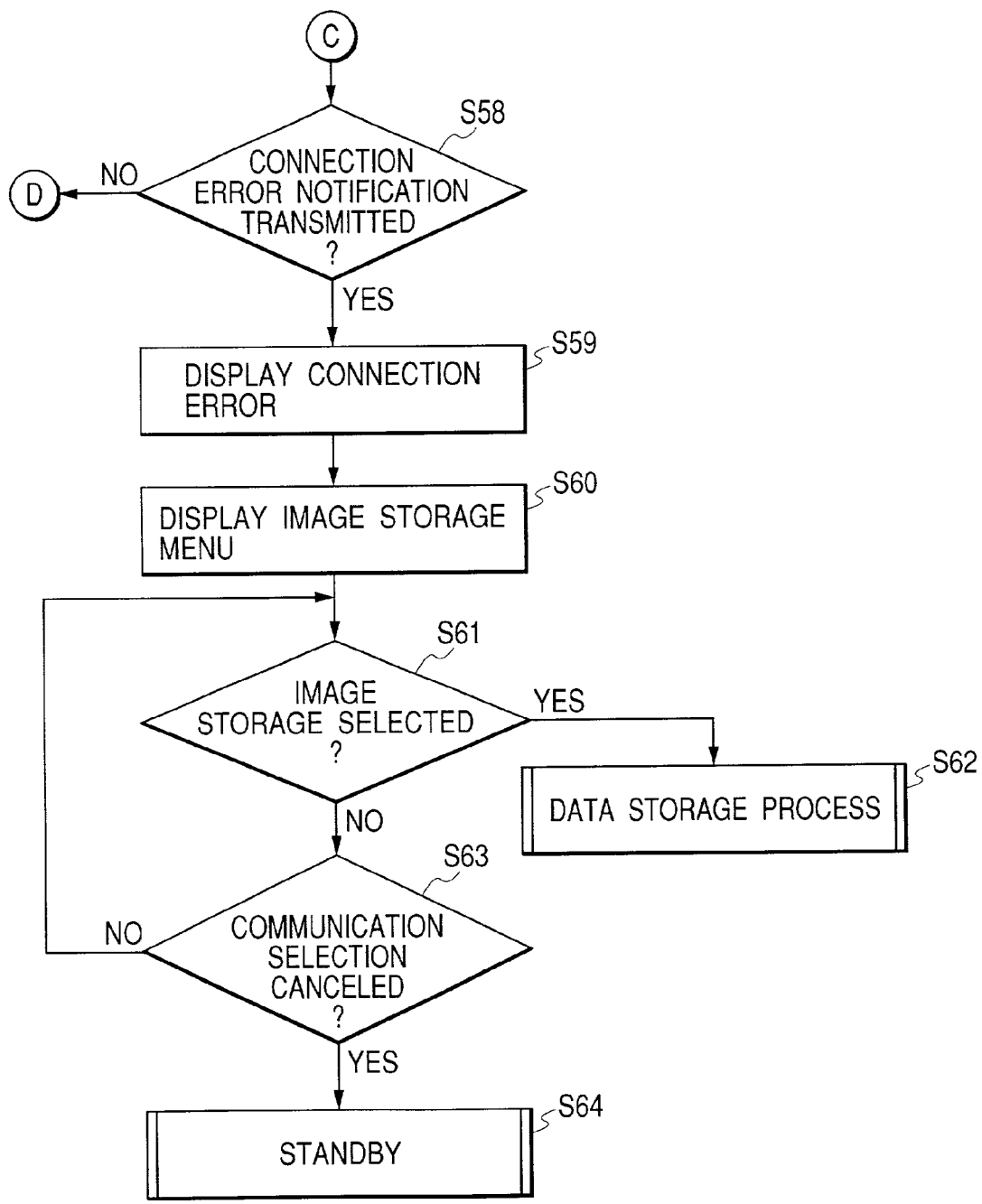
Figure 9:
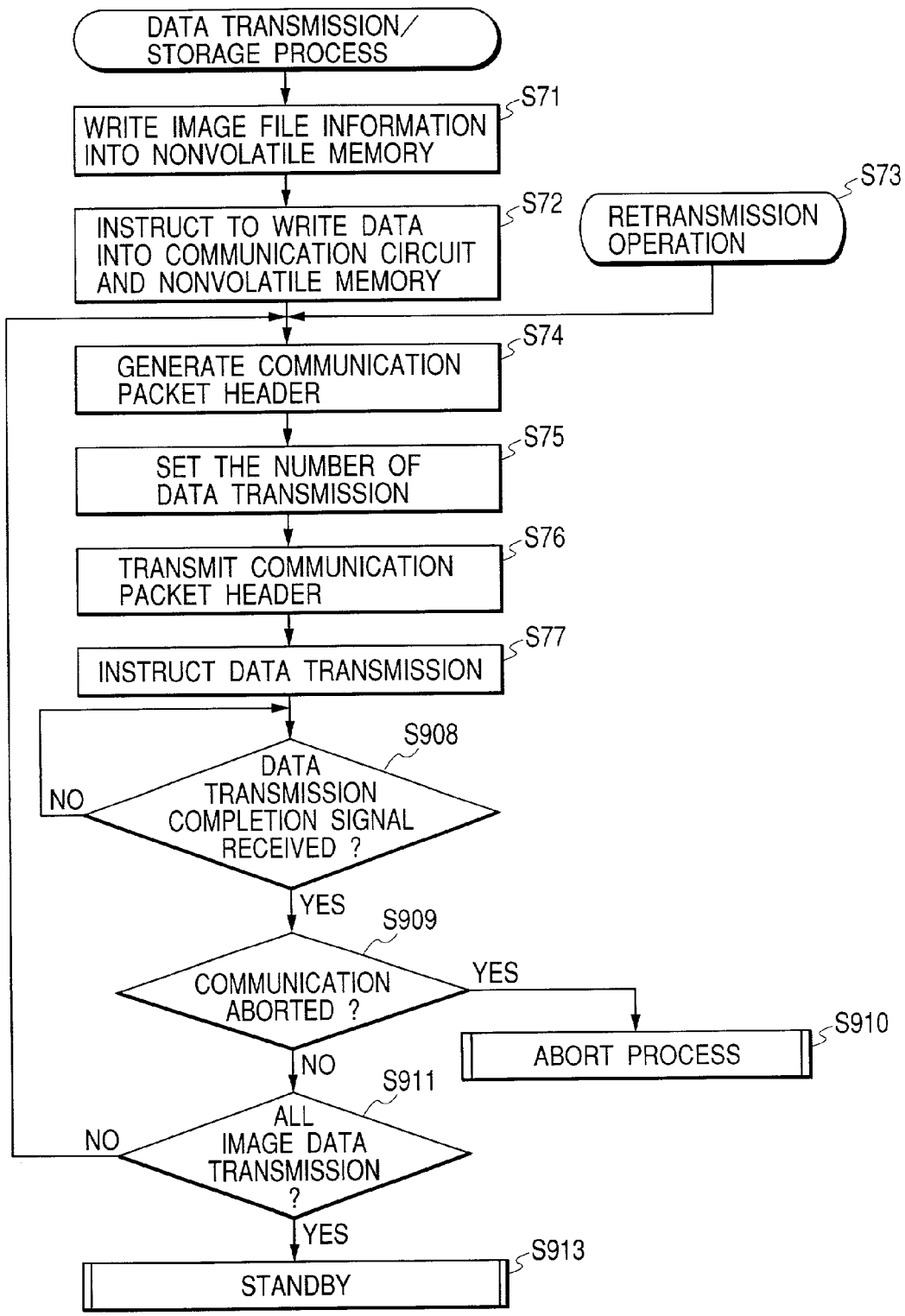
FIG. 9 is a flow chart illustrating the process to be executed by the control circuit in a data transmission/storage process state.
Figure 10:
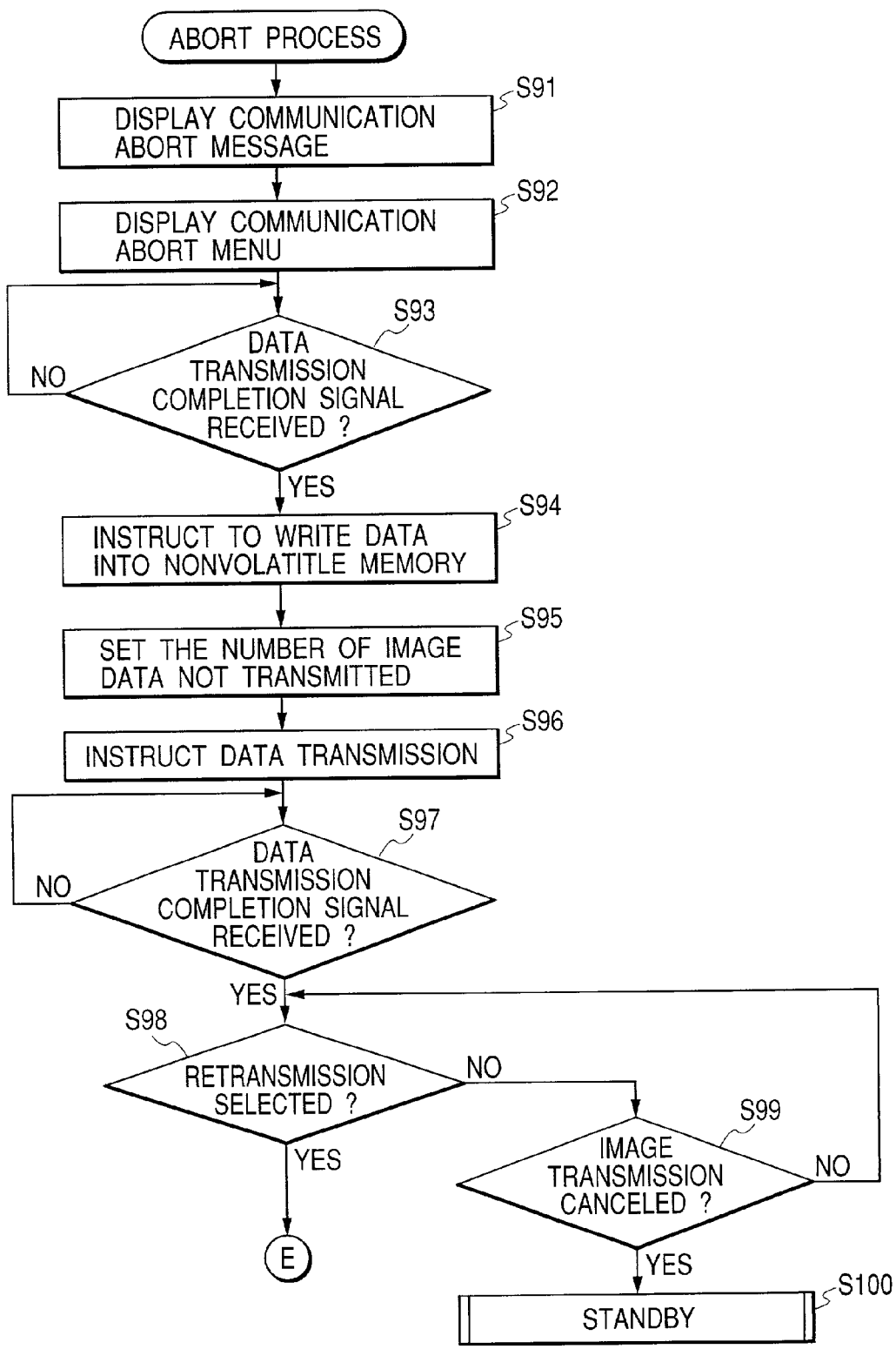
FIGS. 10 and 11 are flow charts illustrating the process to be executed by the control circuit in an abort process.
Figure 11:
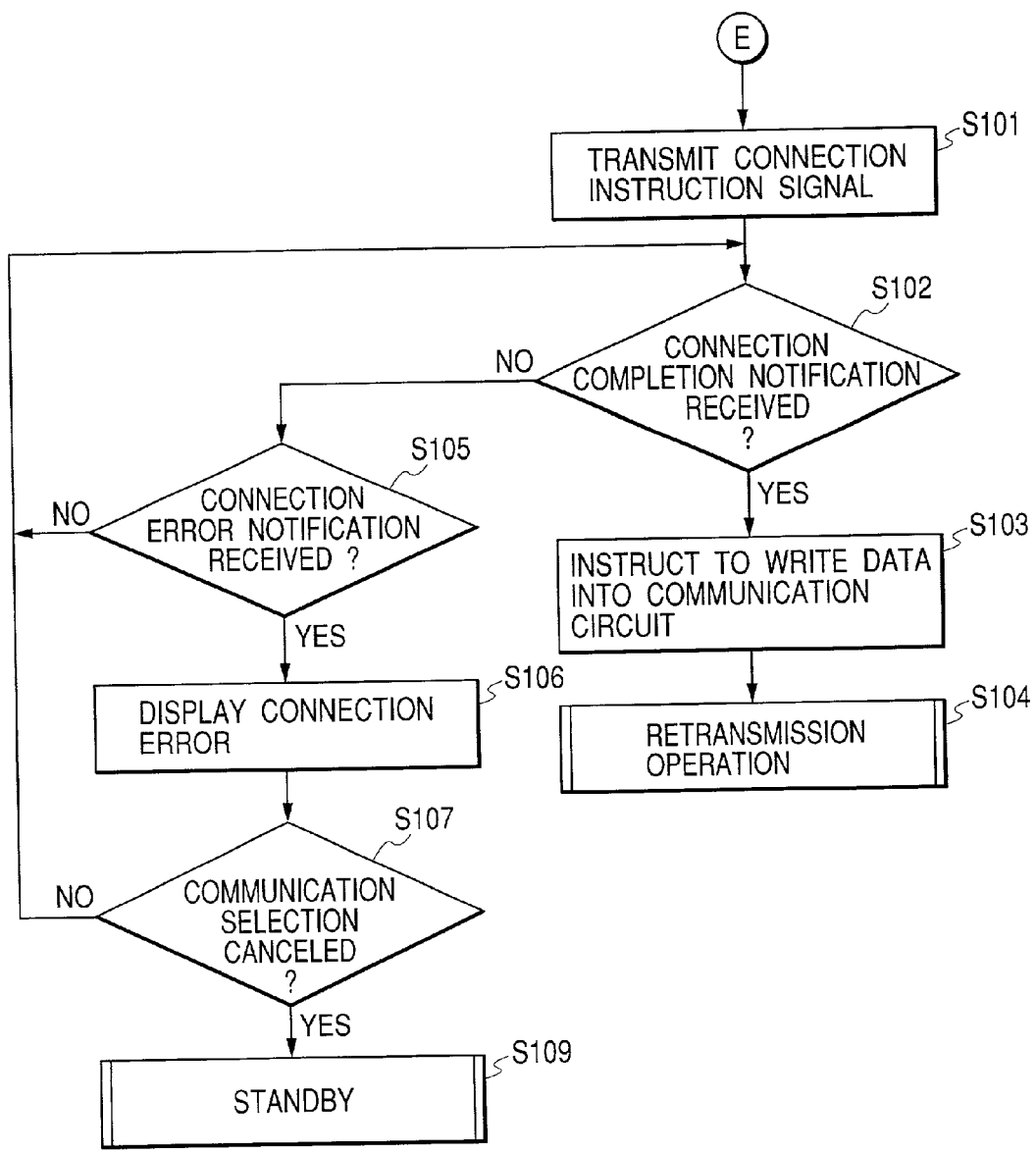

FIG. 3 is a flow chart illustrating the process to be executed by the control circuit 105 in the standby state 201. FIG. 4 is a flow chart illustrating the process to be executed by the control circuit 105 in the menu selection state 202. FIGS. 5 and 6 are flow charts illustrating the process to be executed by the control circuit 105 in the communication control circuit 203. FIGS. 7 and 8 are flow charts illustrating the process to be executed by the control circuit 105 in the capture processed image confirmation state 204. FIG. 9 is a flow chart illustrating the process to be executed by the control circuit 105 in the data transmission/storage process state 205. FIGS. 10 and 11 are flow charts illustrating the process to be executed by the control circuit 105 in an abort process.

The control circuit 105 operates in accordance with the flow charts shown in FIGS. 3 to 11. The flow charts of FIGS. 3 to 11 illustrate a portion of a program stored in the memory 105M. The control circuit 105 is a computer which operates by reading this program from the memory 105M. The memory 105M is a storage medium storing this program capable of being read by the control circuit 105. This program is stored in the IC card and the control circuit 105 reads the program from the IC card via the IC card interface circuit 106. In this case, the IC card corresponds to a storage medium storing this program capable of being read by the control circuit. This program may be supplied externally to the control circuit 105 via the communication circuit 103.

Each operation to be performed by the camera main body 102 under the control of the control circuit 105 will be described with reference to FIGS. 3 to 11 when necessary.

First, an ordinary image capture operation will be described.

As the power of the camera main body 102 is turned on, the control circuit 105 initializes the camera main body 102 to transit to the standby state 201 (FIG. 3). Thereafter, as the user depresses the capture switch among the various switches 109 (YES at S1), the control circuit 105 judges that the user wishes the ordinary image capture operation, and transits to the image capture state 206 (FIG. 2) (S5).

In the image capture state 206, the control circuit issues an image capture instruction to the imaging circuit 113. Upon reception of this instruction, the imaging circuit 113 performs an imaging process by using an image signal supplied from CCD 116, and stores image data in the frame memory 114. Thereafter, the control circuit 105 issues a compression/coding instruction for the image data to the image CODEC 111. Upon reception of this instruction, the image CODEC 111 executes a conversion process for the image data. The coded image data is temporarily stored in the buffer memory 107 via the IC card interface circuit 106, and a process completion is notified to the control circuit 105. Upon reception of this notification, the control circuit 105 transits to the data storage process state 207 (FIG. 2).

In the data storage process state 207, information of a file name, storage date and time and the like is written in the nonvolatile memory 104 of the media card 101. Thereafter, the coded image data is read from the buffer memory 107 and transmitted to and written in the nonvolatile memory 104 via the IC card interface circuit 106. Thereafter, the state transits to the standby state 201 in which the control circuit stands by until a new user's operation is entered.

If the power switch is turned off in the standby state 201, a power-off process is executed (S4).

Next, the operation to be performed when "communication" is selected from the menu will be described.

When the user turns on the menu switch among the various switches 109 in the standby state 201 (YES at S2), the control circuit 105 transits to the menu selection state 202 (S6, FIG. 4).

In the menu selection state 202, the menu including menu items such as an image capture mode, an image deletion and communication is displayed on the display device 110, and the control circuit stands by until one of the menu items is selected. In this menu display, the function of the media card 101 is checked (S11). If the media card 101 has a communication function (YES at S12), a communication menu is displayed as valid (S13), whereas if the media card 101 has no communication function (NO at S12), the communication menu is displayed as invalid (S14). In the case of the valid display, the communication menu is displayed thick on the display device 110 and when the communication menu is selected by the switch 109, the communication control is executed. In the case of the invalid display, the communication menu is displayed thin on the display device 110 and the communication menu cannot be selected by the switch 109 (or even if it is selected, the communication control is not executed).

If the communication menu is valid (YES at S15) and "communication" is selected in the menu (YES at S16), the control circuit 105 transits to the communication control state 203 (S20, FIG. 5). In the menu selection state 202, if a menu other than the communication menu is selected (S17), a menu selection process is performed (S21), whereas if the menu selection state is canceled (S18), the state returns to the standby state 201 (S19).

In the communication control state 203, since a connection is not still established relative to the communication partner (NO at S31), first the communication function is checked (S32) and the communication circuit 103 of the media card 101 is instructed to detect a communication terminal capable of wireless communications in a communication area (S33). Upon reception of this instruction, the communication circuit 103 returns the information on whether a registered partner is detected, to the control circuit 105 if the communication partner is registered beforehand, whereas if not, the communication circuit performs a search operation for a terminal capable of wireless communications in the communication area and returns the information of all communication terminals responded to the search operation to the control circuit 105.

If there is a response to the search (YES at S34), the control circuit 105 received this information sends it to LCD 110 via the display/switch control circuit 108 to display this information (S35). The control circuit stands by until the user selects a communication partner.

As the user selects a communication partner from the displayed information by using the switch 109 (YES at S36), the information of the selected communication partner is supplied from the display/switch control circuit 108 to the control circuit 105. In accordance with the selected communication partner information, the control circuit 105 sends a connection instruction signal to the communication circuit 103 of the media card 101 (S37).

The communication circuit 103 received the connection instruction signal at step S37 establishes a connection in response to the connection instruction signal, and sends a connection completion notification to the control circuit 105.

After the connection instruction signal is sent to the communication circuit 103 of the media card 101, the control circuit 105 stands by until a connection completion is notified from the media card 101 (S42) or a connection error is notified from the media card 101 (S43). When the connection completion is notified at S42, the control circuit 105 stands by until the image capture switch among the switches 109 is depressed (S40), and a connection error is notified from the media card 101, or the communication selection is canceled by the switch 109 (S45).

When the image capture switch among the switches 109 is turned on (YES at S40), the display/switch control circuit 108 sends an image capture instruction to the control circuit 105. Upon reception of this image capture instruction signal, the control circuit 105 transits to the capture processed image confirmation state 204 (S41, FIG. 7).

If the communication selection is canceled at S45, the control circuit 105 instructs the communication circuit 103 to send a disconnection instruction signal to the communication partner (S46). If the connection error is notified at S43 or S431, the connection error is displayed on the display device 110 (S44), and if a connection reestablishment is instructed by the switch 109 (S441), the flow returns to S32.

Similar to the image capture process at Step S5 shown in FIG. 3, in the capture processed image confirmation state 204, the control circuit 105 sends an image capture instruction to the imaging circuit 113 (S50). Upon reception of this instruction, the imaging circuit 113 performs an operation of capturing a series of image data. After the image data is captured in the frame memory 114 (YES at S51), the control circuit 105 reads the image data stored in the frame memory 114 and instructs the display/switch control circuit 108 to display the image data on LCD 110 (S52). A transmission selection menu is displayed on LCD 110 (S53).

In this case, if the user wishes to cancel the captured image, this image can be cancelled by using the switch 109. When the control circuit 105 receives this cancel instruction signal from the display/switch control circuit 108 (YES at S54), the control circuit 105 transits to the communication control state 203 (S55) and the flow advances from YES at S31 shown in FIG. 5 to S40 whereat the control circuit stands by until the image capture switch is newly depressed.

If a user checks the captured image displayed at Step S52 and wishes to transmit this captured image, the user operates the switch 109 to select "transmission instruction" in the menu displayed on LCD 110 (YES at S56). The control circuit 105 transits to the data transmission/storage state 205 (S57, FIG. 9).

In the data transmission/storage state 205, first the control circuit 105 writes information of the file name, storage date and time and the like in the nonvolatile memory 104 of the media card 101 (S71), and then outputs an instruction signal to the IC card interface circuit 112 of the media card 101 to supply the image data to the communication circuit 103 and nonvolatile memory 104 (S72).

Thereafter, a communication packet header (transmission packet header) is generated (S74) and a data transmission number (length) is set to the IC card interface circuit 106 of the camera main body 102 (S75), and the communication packet header is written in the IC card interface circuit 112 of the media card 101 (S76).

The IC card interface circuit 106 is given an instruction to transmit the image data corresponding to the length indicated in the header from the buffer memory 107 to the media card 101 (S77).

Upon reception of this instruction, the IC card interface circuit 106 transmits the image data corresponding to the length indicated by the instruction from the buffer memory 107 to the media card 101. When the transmission is completed, a transmission completion signal is output to the control circuit 105. Upon reception of this transmission completion signal, the control circuit 105 advances to the next Step (YES at S908).

Upon reception of the header of the communication data, the IC card interface circuit 112 of the media card 101 transmits only the header information to the communication circuit 103, and thereafter transmits the image data corresponding to each length to the communication circuit 103 and nonvolatile memory 104 at the same time. The communication circuit 103 transmits the packet including the transmitted header information and image data corresponding to the length to the external, for example, in a wireless communication frequency band.

The above operations are repeated until all the image data is transmitted. After all the image data is transmitted (YES at S911), the control circuit 105 terminates a series of communication controls and transits to the standby state 201 (S913). If the communication with the communication partner 103 is disconnected during the transmission of image data (S909), an abort process is performed (S910).

Next, the operation to be performed when the connection establishment fails will be described.

First, the connection establishment is performed by the processes at Steps S31 to S37 shown in FIG. 5. If a connection instruction is sent from the control circuit 105 to the communication circuit 103 (S37 in FIG. 5), the connection circuit 103 performs a connection establishment with a communication partner in accordance with the instruction. However, if the new connection cannot be established because the instructed communication partner is already communicating with another terminal or the communication partner does not exist in the communication area, then the communication circuit 103 sends a connection establishment error display signal (connection error notification) to the control circuit 105.

Upon reception of this signal (NO at S42 in FIG. 6, YES at S43), the control circuit 105 instructs the display/switch control circuit 108 to display a communication connection error message on LCD 110 (S44). The user looking at this message selects either a connection reestablishment instruction or a cancel instruction by operating the switch 109. In accordance with this selected instruction, the control circuit 105 sends an operation instruction signal to the communication circuit 103.

Even if a connection is established between the communication circuit 103 and a communication partner, this connection is disconnected if the communication partner moves outside the communication area or the communication partner turns off the power. In this case, the communication circuit 103 sends a connection error notification signal to the control circuit 105. The control circuit 105 also performs the process at S44 when this connection error notification is received (S431).

In the state while it is waited for the capture switch to be turned on (S40), if the user selects the cancel (YES at S45), the control circuit 105 aborts a series of communication controls (S46), and the state transits from the communication control state 203 to the standby state 201 (S47).

If a connection error occurs in the capture processed image confirmation state 204, the control circuit 105 receives a communication connection error notification (YES at S58 in FIG. 7) and makes a communication connection error message to be displayed on LCD 110 (S59) and an image storage selection menu to be displayed on LCD 110 (S60). If the user selects the image storage selection menu (YES at S61), the control circuit 105 transits from the capture processed image confirmation state 204 to the data storage process 207 (S62), and after a series of ordinary image storage processes is executed, the state transits to the standby state 201.

Next, an operation will be described which is executed when the connection is disconnected after the connection is established because the state of the communication line becomes bad during image data transmission.

If the state of the communication line becomes bad during normal data transmission because of some reason and the connection is disconnected, the communication circuit 103 sends a communication abort error message signal to the control circuit 105.

Upon reception of this signal (YES at S909 in FIG. 9), the control circuit 105 performs an abort process (S910), and as shown in FIG. 10, makes the display/switch control circuit 108 to display a communication abort error message on LCD 110 (S91) and an abort process menu error on LCD 110 (S92).

The transmission state of the image data is confirmed. In this case, if it is waited for a data transmission completion signal to be transmitted from the IC card interface circuit 106 of the camera main body 102, the operation stands by until this signal is received. Upon reception of the data transmission completion signal (YES at S93), the control circuit 105 instructs the IC card interface circuit 112 of the media card 101 to transmit image data only to the nonvolatile memory 104 (S94), and thereafter supplies the IC card interface circuit 106 of the camera main body 102 with the length information (transmission number) of the image data still not transmitted (S95) to transmit all the remaining image data to the nonvolatile memory 104 (S96).

After the transmission completion of the remaining image data, the IC card interface circuit 106 outputs a data transmission completion signal (S97).

The IC card interface circuit 112 of the media card 101 received the data transmission instruction only to the nonvolatile memory 104 transmits the received image data to the nonvolatile memory 104.

The user confirmed the communication abort message selects either the data retransmission or the cancel of data transmission by operating the switch 109. If the retransmission is selected (YES at S98), the control circuit 105 again outputs a connection instruction to the communication circuit 103 (S101) and stands by until the connection completion notification is transmitted from the communication circuit 103.

Upon reception of the connection completion notification (YES at S102), the control circuit 105 sends an instruction signal for writing image data in the communication circuit 103, to the IC card interface circuit 112 of the media card 101 (S103), and a retransmission operation is performed (S104, S73 in FIG. 9).

In the retransmission operation, a communication packet header is generated (S74), a data transmission number (length) is set to the IC card interface circuit 106 of the camera main body 102 (S75), and the communication packet header is written in the IC card interface circuit 112 of the media circuit 101 (S76).

An instruction to transmit the image data corresponding to the length indicated by the header from the buffer memory 107 to the media card 101 is supplied to the IC card interface circuit 106 of the camera main body 102 (S77).

Upon reception of the instruction to write the image data in the communication circuit 103, the IC card interface circuit 112 of the media card 101 transmits the header information to the communication circuit 103 and transmits the image data succeedingly transmitted to the communication circuit 103.

The IC card interface circuits 106 and 112 and communication circuit 103 perform a series of data transmission operations described earlier until the retransmission of the image data is completed.

If the user selects the cancel (No at S98, YES at S99), the state transits to the standby state 201 (S100).

During this series of operations, although the establishment of a connection to a communication partner is performed in the communication control state 203, the connection establishment timing is not limited thereto but it may be set after the image data is selected and a transmission instruction is received.

(Second Embodiment)

Next, the second embodiment will be described.

The structure of the second embodiment is fundamentally the same as that of the first embodiment. Therefore, in the description of the second embodiment, the description given for the structure of the first embodiment will be used.

Figure 12:
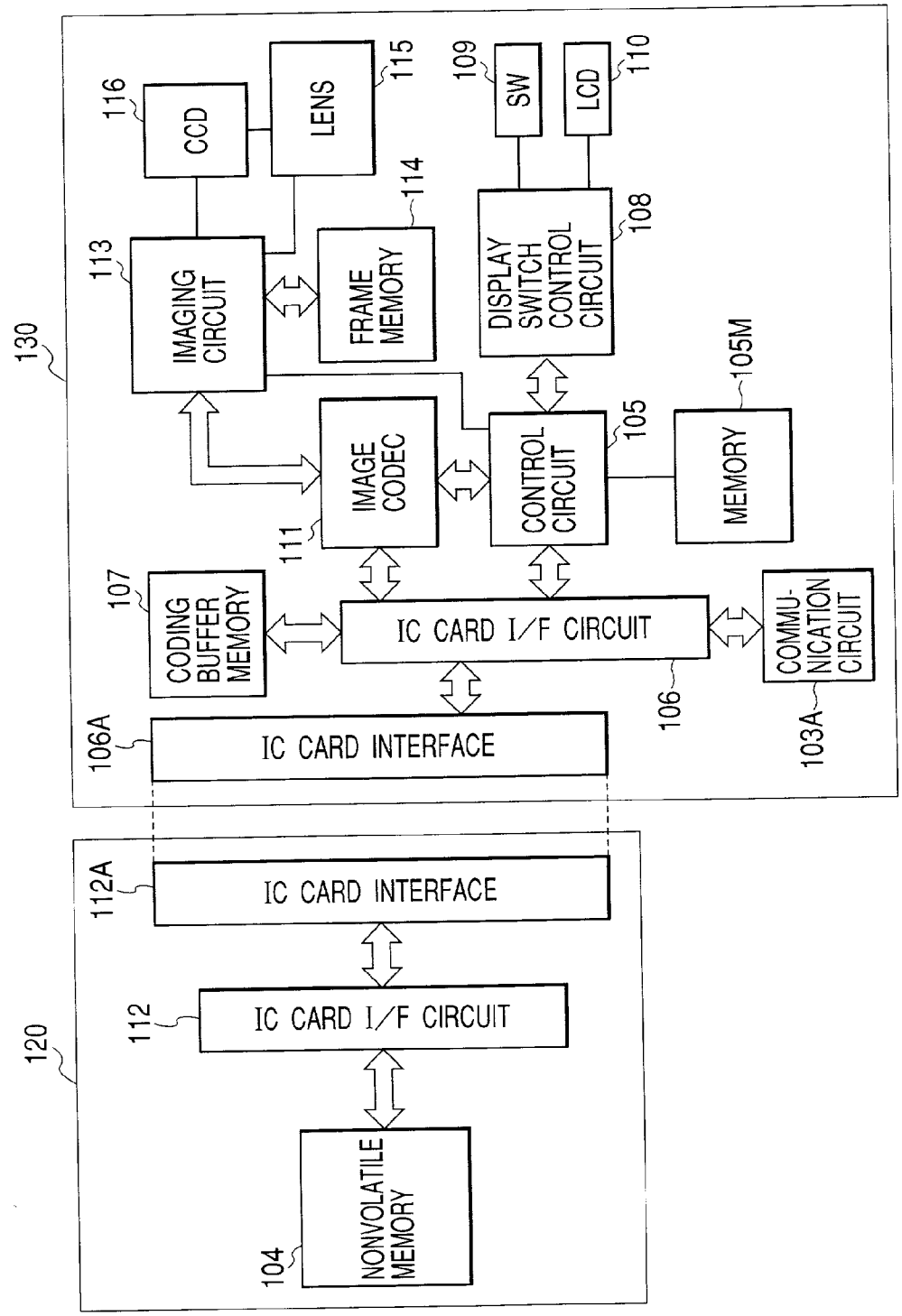
FIG. 12 is a block diagram showing the structure of an image pickup apparatus in which a communication circuit is provided in a camera main body.

In the second embodiment, as shown in FIG. 12, a communication circuit 103A is provided in a camera main body 130. This communication circuit 103A has a similar function to that of the communication circuit 103 described above.

FIG. 12 is a block diagram showing the structure of an image pickup apparatus in which the communication circuit 103A is provided in the camera main body 130. In FIG. 12, like elements to those of the first embodiment are represented by identical reference numerals and the description thereof is omitted.

As shown in FIG. 12, the communication circuit 103A is provided not in the media card 120 but in the camera main body 130.

Next, the operation of the second embodiment will be described paying attention mainly to those operations different from the first embodiment.

First, after the power is turned on, the control circuit 105 executes an initialization process similar to the first embodiment and transits to the standby state 201 (FIG. 3) to wait for a user's operation input.

As the user turns on the menu switch among the switches 109 (YES at S2 in FIG. 3), the control circuit 105 transits to the menu selection state 202 (S6).

In the menu selection state 202, the communication function of the communication circuit 103A built in the camera main body 130 is displayed in the menu screen of LCD 110, and the function of the media card 101 or 120 mounted on the camera main body 130 is checked (S11). If the media card has a communication function, this function is displayed in the menu screen.

The user selects one of communication functions displayed in the menu screen to decide whether the communication function built in the camera main body is used or the communication function of the media card is used. If the user selects the communication function of the media card, the operation similar to the first embodiment is performed.

If the user selects the communication circuit 103A built in the camera main body 130, the control circuit 105 transits to the communication control state 203 (FIG. 5), performs a search display of communication terminals, and if a communication partner capable of communications is selected, a connection is established (S31 to S37 in FIG. 5, S42 in FIG. 6). As the user operates the capture switch among the switches 109 (S40), the control circuit 105 transits to the capture processed image confirmation state 204 (S41, FIG. 7) to execute the operation of capturing image data in the buffer memory 107 and maintains the capture processed image confirmation state 204 until the user selects an image data transmission by operating the switch 109 (S51 to S56 in FIG. 7).

As the user selects the image data transmission (YES at S56), the control circuit 105 transits to the data transmission/ storage process state 205 (S57, FIG. 9).

First, information of the file name, storage date and time and the like is written in the nonvolatile memory 104 (S71), and the control circuit instructs to write image data in the media card 120 and communication circuit 103A (S72). A communication packet header to be used by the communication circuit 103A is generated (S74), and the data length capable of transmitting from the communication circuit 103A at a time is set to the IC card interface circuit 106 of the camera main body 130 as a transmission number (S75). The communication packet header is transmitted (S76) and a transmission instruction signal is supplied to the IC card interface circuit 106 of the camera main body 130 (S77).

Upon reception of this instruction, the IC card interface circuit 106 transmits the image data corresponding to the length indicated by the instruction, from the buffer memory 107 to the communication circuit 103A and IC card interface circuit 112, and after the transmission is completed, a transmission completion signal is sent to the control circuit 105.

In this manner, the communication circuit 103A of the camera main body 130 transmits the image data from the buffer memory 107 to the communication partner, whereas the IC card interface circuit 112 of the media card 120 transmits the transmitted image data to the nonvolatile memory 104 to be stored therein.

This procedure is repeated until all the image data is transmitted. When all the image data is transmitted (YES at S81), the control circuit 105 terminates a series of communication controls and transits to the standby state 201 (S82).

Since the operation to be executed after the connection establishment fails is similar to the first embodiment and the description thereof is omitted.

Next, an operation will be described which is executed when the connection is disconnected after the connection is established because the state of the communication line becomes bad during image data transmission.

If the state of the communication line becomes bad during normal data transmission because of some reason and the connection is disconnected (YES at Step S79 in FIG. 9), the communication circuit 103A sends a communication abort error message signal to the control circuit 105 (S80).

Upon reception of this communication abort error message signal, as shown in FIG. 10, the control circuit 105 instructs the display/switch control circuit 108 to display a communication abort error message on LCD 110 (S91), and confirms the transmission state of the image data. In this case, if it is waited for the transfer completion signal to be transmitted from the IC card interface circuit 106 of the camera main body 130, the control circuit stands by until this signal is received.

Upon reception of the data transmission completion signal (YES at S93), the control circuit 105 instructs the IC card interface circuit 106 of the camera main body 130 to transmit image data only to the nonvolatile memory 104 (S94), and thereafter outputs the length information of the image data still not transmitted (S95) to transmit all the remaining image data to the nonvolatile memory 104 (S96).

The user confirmed the communication abort message selects either the data retransmission or the cancel of data transmission by operating the switch 109. If the retransmission is selected (YES at S98), the control circuit 105 again outputs a connection instruction to the communication circuit 103A (S101) and stands by until the connection completion notification is transmitted from the communication circuit 103A.

Upon reception of the connection completion notification (YES at S102), the control circuit 105 sends an instruction signal for transmitting the image data only to the communication circuit 103A (S103), transmits the header information to the communication circuit 103A, and sends an instruction to transmit the image data corresponding to the length indicated by the header from the buffer memory 107, to the IC card interface circuit 106 of the camera main body 130 to start transmitting the image data (S104, S73 in FIG. 9). The communication circuit 103A performs a series of data transfer operations described earlier until the retransmission of the image data is completed.

If the user selects the cancel (NO at S98, YES at S99), the state transits to the standby state 201 (S100).

Also in the second embodiment, during this series of operations, although the establishment of a connection to a communication partner is performed in the communication control state 203, the connection establishment timing is not limited thereto but it may be set after the image data is selected and a transmission instruction is received.

In the first and second embodiments, image data is automatically stored in the nonvolatile memory 104 during the communication operation. Instead, a menu item of not storing image data may be provided, and if a user selects this item, the image data is not stored in the nonvolatile memory 104.

Also in the first and second embodiments, in the communication control state 203, the control circuit 105 transits to the standby state 201 after the communication operation, as shown at Step S913 of FIG. 5. Instead, for example, the control circuit may transit to the menu selection state 202 or communication control state 203 after the communication operation to thereby continue the communication operation unless it is canceled.

A portion or the whole of the process of realizing the function of each of the embodiments may be performed by an OS or the like running on a computer.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The invention has been described with reference to the preferred embodiments. The invention is not limited only to the embodiments, but various modifications are possible without departing from the scope of claims.

What is claimed is:

1. An image pickup apparatus comprising:
   connection means for connecting a card; and
   transferring means for transferring captured image data to both transmission means and a memory provided in the card such that the captured image data is transferred to the memory while the captured image data is transmitted from the transmission means,
   wherein said transferring means transfers the captured image data in data length in accordance with whether the captured image data is transferred to the transmission means or not when the captured image data is transferred to the memory.

2. An image pickup apparatus according to claim 1, wherein said transferring means transfers the image data to the transmission means provided in the card.

3. An image pickup apparatus according to claim 1, wherein said transferring means transfers the image data to the transmission means provided in the image pickup apparatus.

4. An image pickup apparatus according to claim 1, wherein said transferring means transfers the image data corresponding to a data length of a transmission packet to the transmission means and the memory.

5. An image pickup apparatus according to claim 4, wherein said transferring means transfers the image data still not transferred to the memory, when transmission is aborted.

6. An image pickup apparatus according to claim 4, wherein said transferring means transfers the image data still not transferred to the memory without partitioning the image data by the data length of the transmission packet, when transmission is aborted.

7. An image pickup apparatus according to claim 1, wherein said transferring means repeats a header transfer process and an image data process until the transfer of the image data is completed, in the header transfer process, a header of a transmission packet is transferred to the transmission means, and in the image data transfer process, the image data corresponding to a data length of the transmission packet is transferred to the transmission means and the memory.

8. An image pickup apparatus according to claim 1, wherein said transferring means writes a file name of the image data in the memory, and thereafter repeats a transfer process of transferring a header of a transmission packet to the transmission means and a transfer process of transferring the image data corresponding to a data length to the transmission means and the memory, until the transfer of the image data is completed.

9. A method of transferring image data of an image pickup apparatus having connection means for connecting a card, comprising steps of:
   taking an image and generating image data; and
   transferring the image data to both transmission means and a memory provided in the card such that the captured image data is transferred to the memory while the captured image data is transmitted from the transmission means,
   wherein said transferring step transfers the captured image data in data length in accordance with whether the captured image data is transferred to the transmission means or not when the captured image data is transferred to the memory.

10. A method according to claim 9, wherein said transferring step transfers the image data to the transmission means provided in the card.

11. A method according to claim 9, wherein said transferring step transfers the image data to the transmission means provided in the image pickup apparatus.

12. A method according to claim 9, wherein said transferring step transfers the image data corresponding to a data length of a transmission packet to the transmission means and the memory.

13. A method according to claim 12, wherein said transferring step transfers the image data still not transferred to the memory, when transmission is aborted.

14. A method according to claim 12, wherein said transferring step transfers the image data still not transferred to the memory without partitioning the image data by the data length of the transmission packet, when transmission is aborted.

15. A method according to claim 9, wherein said transferring step repeats a header transfer process and an image data process until the transfer of the image data is completed, in the header transfer process, a header of a transmission packet is transferred to the transmission means, and in the image data transfer process, the image data corresponding to a data length of the transmission packet is transferred to the transmission means and the memory.

16. A method according to claim 9, wherein said transferring step writes a file name of the image data in the memory, and thereafter repeats a transfer process of transferring a header of a transmission packet to the transmission means and a transfer process of transferring the image data corresponding to a data length to the transmission means and the memory, until the transfer of the image data is completed.

17. A storage medium storing a program for transferring image data of an image pickup apparatus having connection means for connecting a card, the program comprising steps of:
   taking an image and generating image data; and
   transferring the image data to both transmission means and a memory provided in the card such that the captured image data is transferred to the memory while the captured image data is transmitted from the transmission means,
   wherein said transferring step transfers the captured image data in data length in accordance with whether the captured image data is transferred to the transmission means or not when the captured image data is transferred to the memory.

18. A storage medium according to claim 17, wherein said transferring step transfers the image data to the transmission means provided in the card.

19. A storage medium according to claim 17, wherein said transferring step transfers the image data to the transmission means provided in the image pickup apparatus.

20. A storage medium according to claim 17, wherein said transferring step transfers the image data corresponding to a data length of a transmission packet to the transmission means and the memory.

21. A storage medium according to claim 20, wherein said transferring step transfers the image data still not transferred to the memory, when transmission is aborted.

22. A storage medium according to claim 20, wherein said transferring step transfers the image data still not transferred to the memory without partitioning the image data by the data length of the transmission packet, when transmission is aborted.

23. A storage medium according to claim 17, wherein said transferring step repeats a header transfer process and an image data process until the transfer of the image data is completed, in the header transfer process, a header of a transmission packet is transferred to the transmission means, and in the image data transfer process, the image data corresponding to a data length of the transmission packet is transferred to the transmission means and the memory.

24. A storage medium according to claim 17, wherein said transferring step writes a file name of the image data in the memory, and thereafter repeats a transfer process of transferring a header of a transmission packet to the transmission means and a transfer process of transferring the image data corresponding to a data length to the transmission means and the memory, until the transfer of the image data is completed.

* * * * *

UNITED STATES PATENT AND TRADEMARK OFFICE
CERTIFICATE OF CORRECTION

PATENT NO. : 7,071,975 B2 Page 1 of 1
APPLICATION NO. : 09/947357
DATED : July 4, 2006
INVENTOR(S) : Myojo It is certified that error appears in the above-identified patent and that said Letters Patent is hereby corrected as shown below:

ON THE TITLE PAGE, AT ITEM (56), REFERENCES CITED:
Foreign Patent Documents, "JP 04170881 A" should read --JP 04-170881 A--; "JP 10276390 A" should read --JP 10-276390 A--; "JP 10308981 A" should read --JP 10-308981 A--; and "JP 09-083930 3/1997" should be deleted.

SHEET NO. 10 of 12:
Figure 10, Step S94, "NONVOLATITLE" should read --NONVOLATILE--.

COLUMN 8:
Line 27, "(No" should read --(NO--.

COLUMN 9:
Line 59, "and" should be deleted.

Signed and Sealed this

Twentieth Day of May, 2008

JON W. DUDAS
*Director of the United States Patent and Trademark Office*